(12) United States Patent
Thodupunoori

(10) Patent No.: US 9,071,635 B1
(45) Date of Patent: Jun. 30, 2015

(54) METHODS AND APPARATUS FOR IDENTIFYING PAGING ACTIVITIES DURING IDLE MODE

(75) Inventor: Santhosh Kumar Thodupunoori, San Jose, CA (US)

(73) Assignee: Wichorus, Inc., Naperville, IL (US)

( * ) Notice: Subject to any disclaimer, the term of this patent is extended or adjusted under 35 U.S.C. 154(b) by 692 days.

(21) Appl. No.: 13/277,045

(22) Filed: Oct. 19, 2011

(51) Int. Cl.
G06F 15/173 (2006.01)
G06F 11/00 (2006.01)
H04L 29/06 (2006.01)
H04L 12/26 (2006.01)

(52) U.S. Cl.
CPC .......... H04L 63/1416 (2013.01); H04L 43/062 (2013.01)

(58) Field of Classification Search
CPC ......... H04L 43/12; H04L 47/10; H04L 47/11; H04L 47/14; H04L 47/2408; H04W 12/12; H04W 84/027
USPC ................... 370/252, 311, 345; 455/458, 574
See application file for complete search history.

(56) References Cited

U.S. PATENT DOCUMENTS

| 2005/0213504 | A1* | 9/2005 | Enomoto et al. | 370/235 |
|---|---|---|---|---|
| 2005/0254490 | A1* | 11/2005 | Gallatin et al. | 370/389 |
| 2007/0192863 | A1* | 8/2007 | Kapoor et al. | 726/23 |
| 2008/0081647 | A1* | 4/2008 | Lee et al. | 455/466 |
| 2009/0088147 | A1* | 4/2009 | Bu et al. | 455/423 |
| 2009/0310503 | A1* | 12/2009 | Tenny et al. | 370/252 |
| 2011/0310804 | A1* | 12/2011 | Beygzadeh | 370/328 |
| 2012/0028657 | A1* | 2/2012 | Chin et al. | 455/458 |
| 2012/0124197 | A1* | 5/2012 | Ghai et al. | 709/224 |
| 2014/0051485 | A1* | 2/2014 | Wang et al. | 455/574 |

* cited by examiner

Primary Examiner — Man Phan
Assistant Examiner — Ryan Kavleski
(74) Attorney, Agent, or Firm — James M Wu; JW Law Group

(57) ABSTRACT

A network configuration capable of using a paging activity sink to aggregate and analyze flood of paging messages during an idle mode is disclosed. In one embodiment, a process using the paging activity sink is able to detect an idle mode of end user ("EU") equipment in a communication network. Upon detecting a downstream push data such as push mail addressing to the EU equipment indicating a pending message, a predefined portion of data from the first downstream push data is copied or duplicated to form a copy of paging announcement. While sending the downstream push data to the EU equipment, the process forwards the copy of paging announcement to a network element ("NE") such as a paging activity server for analyzing paging activities.

4 Claims, 6 Drawing Sheets

METHODS AND APPARATUS FOR IDENTIFYING PAGING ACTIVITIES DURING IDLE MODE

FIELD

The exemplary embodiment(s) of the present invention relates to communications network. More specifically, the exemplary embodiment(s) of the present invention relates to identifying and analyzing paging activities.

BACKGROUND

With rapid growth of mobile data transfer over a high-speed communication network such as 3G or 4G cellular services, managing and controlling such data transfer become increasingly difficult and complicated. A conventional network layout includes Internet, LAN (local area network), and wireless networks that include hundreds of network devices such as access switches, routers, and bridges for facilitating data delivery from source devices to destination devices. Transferring massive amount of data efficiently between wireless portable devices such as smart phones and laptops over a typical and/or standard network becomes increasingly challenging.

In typical mobile wireless networks, subscriber devices or end user ("EU") equipments enter idle mode or idle state to conserve power. When downstream data arrives for a mobile in idle state, a conventional gateway typically pages the mobile in order to wake up the mobile from the idle mode. However, in a high speed packet core gateway, this type of paging process could result in high signaling load bursts. Bursts of paging messages can negatively impact overall network performance.

Another type of Internet attacks is a denial-of-service ("DOS") attack during an idle mode of an EU equipment. A DOS attack, in one example, is an attempt to flood paging messages to a target machine during an idle mode whereby causing the target machine to exit idle mode frequently resulting in paging flood on the network and battery drain on the target machine.

To track, monitor, and/or understand causes of such paging bursts or DOS attacks, a conventional approach is to install sniffers in the network and correlate traffic patterns with bursts and/or flood of paging messages. A drawback with the conventional sniffer is that it is expensive to sniff all traffic continuously. Continuously sniffing massive amount data will not only consume network resources, but also negatively impacts network performance. Another drawback with a typical sniffer is lack of accuracy because, depending on location of sniffer(s), it may not know exactly which traffic actually causes the burst(s) or flooding.

SUMMARY

A communications network employing idle mode anchor and a paging activity sink to aggregate and analyze flood of paging messages during an idle mode is disclosed. In one embodiment, a process using the paging activity sink is able to detect an idle mode of end user ("EU") equipment in a communication network. Upon detecting a downstream push data such as push mail addressing to the EU equipment indicating a pending message, a predefined portion of data from the first downstream push data is copied or duplicated to form a copy of paging announcement. While sending the paging announcement to the EU equipment, the process forwards the copy of paging announcement to a network element ("NE") such as a paging activity server for analyzing paging activities.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
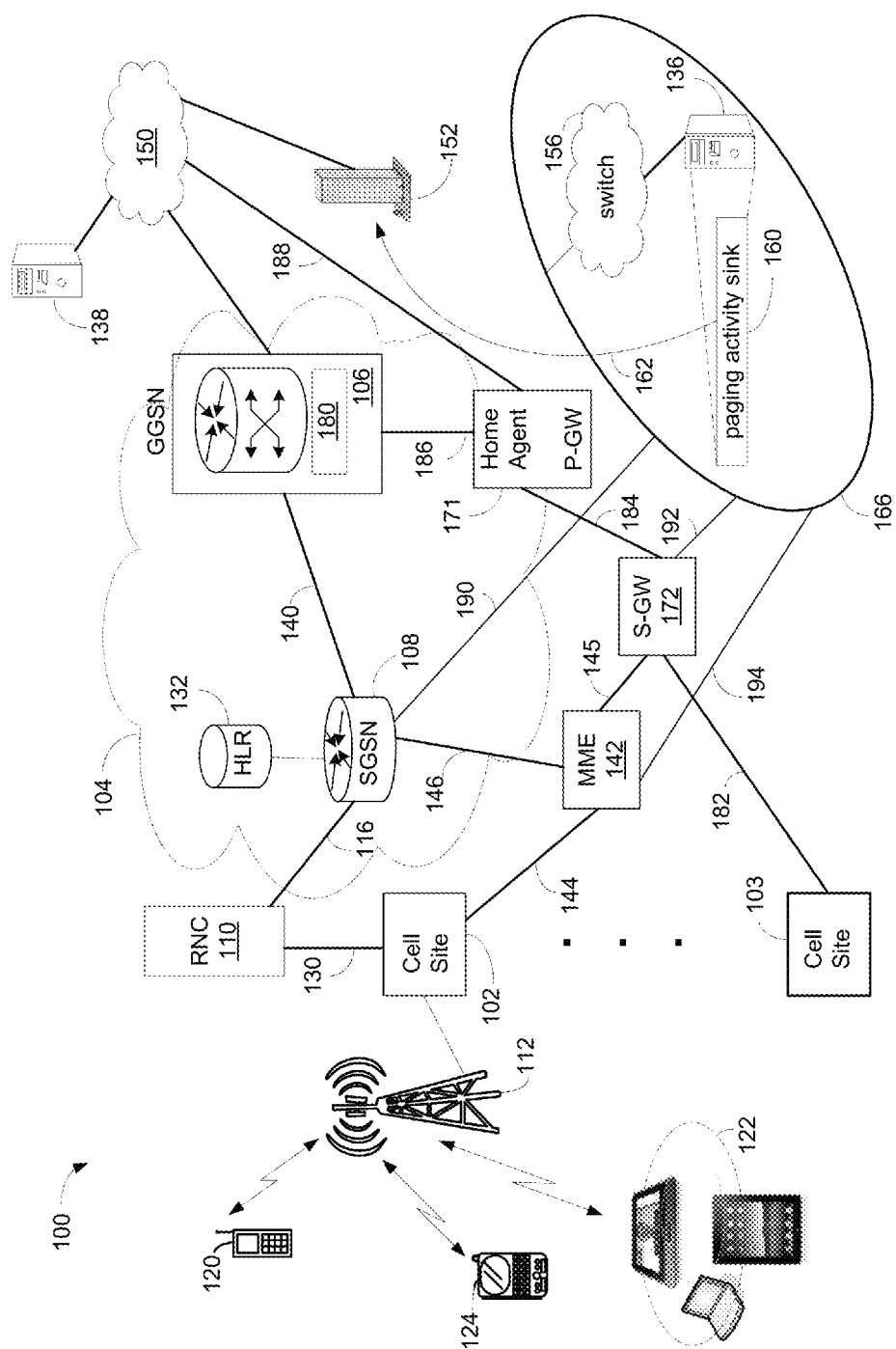
FIG. 1 is a block diagram illustrating a network configuration having one or more network devices configured to aggregate paging messages using paging activity sink to analyze paging activities in accordance with one embodiment of the present invention.

Exemplary embodiment(s) of the present invention is described herein in the context of a method, device, and apparatus of employing paging activity sink to identify paging activities during an idle mode.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, for example of ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

An embodiment(s) of the present invention discloses a method and/or a network apparatus having a paging activity sink that aggregates and analyzes paging activity during the idle mode. In one embodiment, a network element or apparatus capable of implementing paging activity sink detects end user ("EU") equipment in an idle mode or state in a communications network. Upon detecting a downstream push data such as push mail addressing to the EU equipment indicating a new message, a predefined portion of the first downstream push data is copied or duplicated to form a copy of special paging announcement. While sending the downstream push data to the EU equipment, the network apparatus forwards the copy of special paging announcement to a network element ("NE") such as a paging activity server to analyze paging activities.

FIG. 1 is a block diagram illustrating a network configuration having one or more network devices configured to aggregate paging messages using paging activity sink to analyze paging activities in accordance with one embodiment of the present invention. Diagram 100 illustrates cell sites 102-103, switching network 104, network nodes 106-108, mobility management entity ("MME") 142, radio network controller ("RNC") 110, serving gateway ("S-GW") 172, and packet data network gateway ("P-GW") or HomeAgent 171. Node 106 is further coupled to Internet, wide area network ("WAN"), or virtual private network ("VPN") 150. Internet, WAN, or VPN, hereinafter referred to as Internet, provides network communication between node 106 and network devices such as server 138 and service provider(s) or subscription partner 152. Service provider 152, in one aspect, is a network security firm responsible for monitoring security of the network. Server 138 may be a remote network server capable of implementing paging activity sink. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), 4G, or combination of 3G and 4G cellular network configuration. MME 142, in one aspect, is coupled to cell site 102 and S-GW 172 via connections 144-145 and is capable of facilitating data transfer between 3G and LTE (long term evolution) or between 2G and LTE (or 4G). In LTE (or 4G) network environment, MME 142 performs various controlling/managing functions, such as UE (user equipment) idle mode for tracking, paging, and retransmitting. MME 142 also provides network security management as well as resource allocations. To access packet based and/or IP based networks, MME 142, in one aspect, depends on S-GW 172 via connection 145 to reach other networks such as Ethernet and/or Internet 150.

S-GW 172, in one example, is coupled to MME 142 and cell site 103 via connections 145 and 182, and is capable of routing data packets from cell site 103 (eNodeB) or MME 142 to P-GW 171 via connection 184. Note that S-GW 170 can couple to additional network elements such as other MMEs and/or base stations. In an evolved packet core ("EPC") network environment, S-GW 172 is used to perform an anchoring function for mobility between 3G and 4G equipments. S-GW 172, in one aspect, performs various network management functions, such as terminating paths, paging idle UEs, storing data, routing information, generating replica, and the like.

P-GW 171, in one embodiment, is coupled to S-GW 172, GGSN 106, and Internet 150 via connections 184-188, wherein P-GW 171 is able to provide network communication between an UE and IP based networks such as Internet 150. P-GW 171 is used for connectivity, packet filtering, inspection, data usage, billing, or PCRF (policy and charging rules function) enforcement, et cetera. P-GW 171 also provides an anchoring function for mobility between 3G and 4G (or LTE) packet core network(s). Note that P-GW 171 could be merged into GGSN 106 as a single NE or node. Alternatively, P-GW 171 is able to directly route data between UEs via Internet 150.

Switching network 104 may be referred to as packet core network and cell sites 102-103 may be referred to as radio access networks. It should be noted that a different network architecture or configuration may be implemented for 3G, 4G, or 5G cellular networks with different layout of network elements, and/or differently named network elements, but the underlying concept of exemplary embodiment would not change. Switching network 104, in one aspect, includes IP and/or Multi Protocol Label Switching ("MPLS") based network capable of operating at a layer of Open Systems Interconnection Basic Reference Model ("OSI model") for information transfer between clients and network servers. Referring back to FIG. 1, network 104, including network nodes 106-108, a home location register ("HLR") 132, is able to route packet traffic between cell sites 102-103 and Internet 150. For example, node 108 transmits information between cell site 102 and HLR 132 via connections 116 and 130. Node 106 transmits information to (and receives information from) cell site 102 via connections 140, 116, and 130.

Node 106, in one embodiment, is a gateway GPRS support node ("GGSN") wherein GPRS is a general packet radio service. GGSN 106 includes one or more routers or switches capable of managing, monitoring, and routing network traffic or network flows between sources and destinations. Network flow or packet flow, in one example, is a network access initiated by a subscriber and/or a user. Network node or GGSN 106, hereinafter referred to as GGSN, can also be a router, Access Service Network Gateway, Packet Data Network Gateway ("P-GW" or "PDN-GW"), Serving Gateway ("S-GW"), switch, hub, or a combination of router, Access Service Network Gateway, P-GW, S-GW, switch, and/or hub.

Node 108, in one embodiment, is a serving GPRS support node ("SGSN") configured to authenticate portable wireless UEs, registering mobile devices, collecting network usage information for billing, et cetera. While SGSN 108 tracks and/or controls mobile communication, GGSN 106 inspects and routes information and/or packet traffic between mobile terminal(s) and intended destination(s). Alternatively, SGSN 108 is connected to MME 142 which is also able to route packet streams to/from a long term evolution ("LTE") network. MME 142, for example, can track and/or page active and/or idle user equipments ("UEs") or subscribers' mobile terminals in an LTE network. Note that SGSN 108 can include MME functions. It should be noted that node 108 can be SGSN, MME, and/or a combination of SGSN and MME.

RNC 110 may be coupled to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling NEs in UMTS (universal mobile telecommunications system) radio access network ("UTRAN") and base stations that are connected to it.

Cell site 102, also known as base station, node B, or eNodeB, includes a radio tower 112. Radio tower 112 is further coupled to various UEs, such as a cellular phone 120, a handheld device 124, tablets and/or iPad® 122 via wireless communications. Handheld device 124 can be a smart phone, such as iPhone®, BlackBerry®, Android®, and so on. Cell site 102 facilitates network communication between mobile devices such as handheld device 124 and iPad® 122 via radio tower 112. It should be noted that cell site 102 may include additional radio towers as well as other land switching circuitry.

Mobile networks are classified into two parts, namely a radio access part such as cell site 102 and core network part such as network 104. The packet core network, which may include a gateway node (SGSN, GGSN), allocates the IP address to the mobile device enabling the allocated mobile device to communicate with the global IP. In one example, GGSN acts as a router and the IP address is allocated by a DNS server. GGSN provides a tunnel to the mobile user. In one aspect, the core network or packet core gateway includes accounting and authorization components, such as billing, charging, subscribing, tracking, authorizing, performance, usage, and the like.

The radio access network includes a radio base station such as cell site 102 and a controller. The controller can be located physically within a base station node or a gateway node. In one example, the radio network controller and the base station constitute the radio access network. The core network or a gateway node connects to a radio access network to communicate with the IP network. The gateway node is a gateway for IP access of wireless networks.

Referring back to FIG. 1, diagram 100 further includes an idle mode anchor ("IMA") 166 employed to monitor and aggregate paging messages across the network or a section of the network for analyzing idle mode paging activities. IMA 166, in one embodiment, includes a server 136 with a paging activity sink 160, wherein server 136 is coupled to S-GW 172 via an internal network 156. Alternatively, server 136 can directly couple to S-GW 172 without internal network 156. It should be noted that IMA 166 can be hardware, firmware, software, or a combination of hardware, firmware, and software. The modules and/or components of IMA 166 may be placed and/or implemented in a single device or in a multiple network elements such as server 136, P-GW 171, MME 142, SGSN 108, or GGSN 106. Depending on network applications, IMA 166 can be optionally coupled to SGSN 108 via connection 190, S-GW 172 via connection 192, and/or MME 142 via connection 194.

It should be noted that, in 2G/3G networks, paging activity is handled or originates at SGSN 108, while in WiMAX (4G) network environment, paging activity originates at ASN-GW (Access Service Network Gateway). Also, In LTE (4G) network environment, paging activity is handled by S-GW and/or MME. As such, depending on the applications, IMA 166 can be implemented in ASN-GW, SGSN, S-GW, or MME, hereinafter can be referred to as ASN-GW/SGSN/S-GW/MME.

ASN-GW/SGSN/S-GW/MME, in one embodiment, includes a paging module 180 which may be part of IMA 166 capable of monitoring downstream push data traffic that flows through the network in accordance with a predefined set of specifications. For example, paging module 180 facilitates communication between IMA 166 and service provider or network operator 152 whereby paging status report(s) can be transmitted. A function of ASN-GW/SGSN/S-GW/MME, in one embodiment, is to detect and acknowledge that UE equipment such as smart phone 124 is in idle mode. Upon detecting a downstream push data (such as push mail) for the UE equipment, paging module 180 copies a predefined portion of downstream push data and composes a special paging message or announcement to the paging activity sink 160. A paging burst or idle mode denial of service ("DOS") attacks may be declared by IMA 166 based on accumulated or aggregated special paging messages.

An advantage of employing IMA 166 is to identify or pin-point root cause of burst in paging activity using minimal resources.

Figure 2:
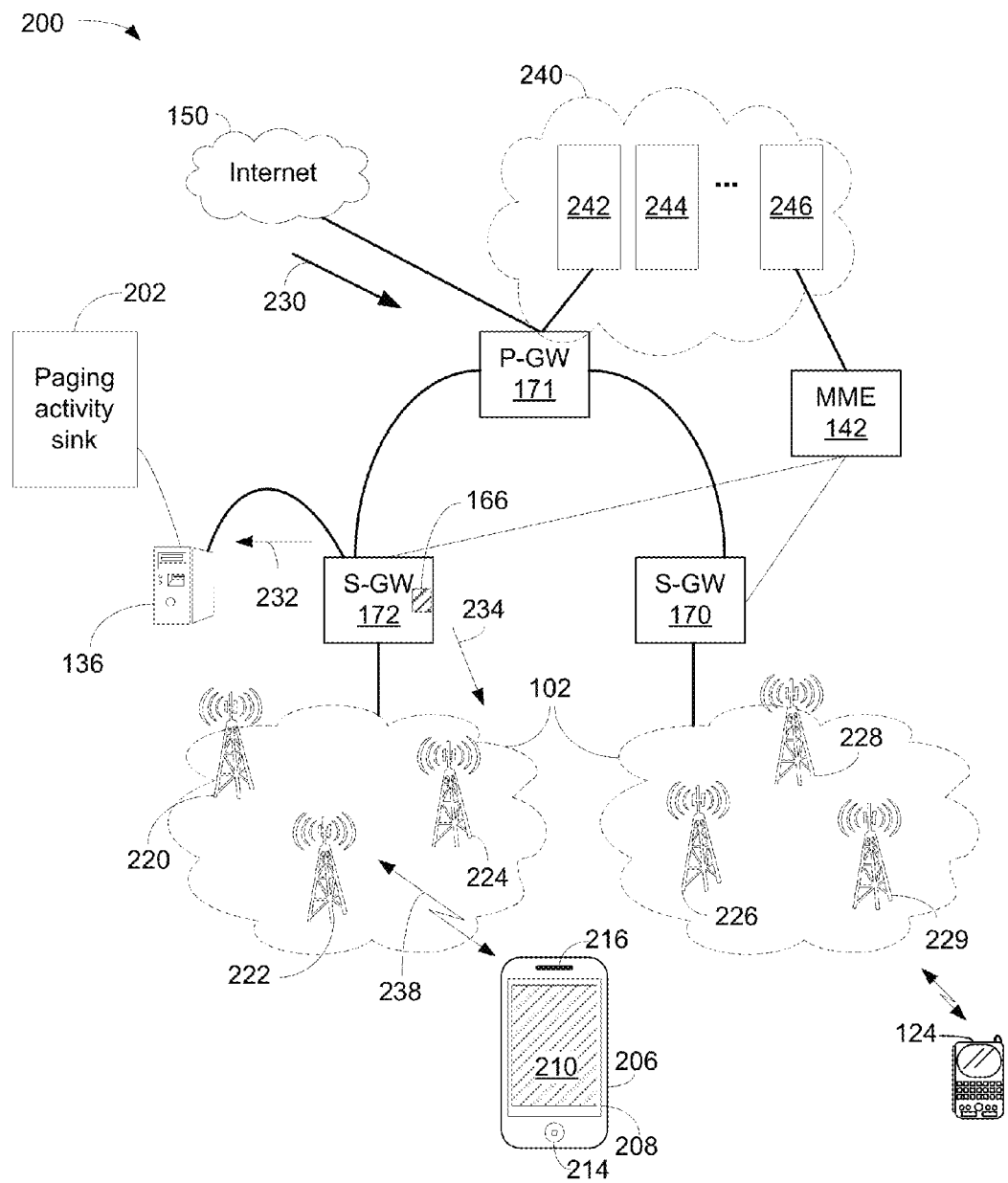
FIG. 2 is a block diagram illustrating an alternative network layout using IMA and paging activity sink to analyze bursts of paging messages in accordance with one embodiment of the present invention.

FIG. 2 is a block diagram 200 illustrating an alternative network layout using IMA and paging activity sink to analyze bursts of paging messages in accordance with one embodiment of the present invention. Diagram 200 includes P-GW 171, two S-GW 172, two cell sites (or base stations) 102, server 136, and Internet 150. P-GW 171 includes various components 240 which further includes billing module 242, subscribing module 244, tracking module 246, and the like to facilitate routing activities between source nodes and destination nodes. It should be noted that the underlying concept of the exemplary embodiment(s) of the present invention would not change if one or more blocks (or devices) were added to or removed from diagram 200.

Cell site 102 includes multiple radio towers such as towers 220-224 or towers 226-229 and is able to facilitate communication between mobile device 206 and P-GW 171 via S-GW 172. In one example, the alternative network layout illustrated by diagram 200 is a 3GPP (3rd Generation Partnership Project) LTE based mobile broadband communications network. S-GW 172 is also configured to couple with MME 143 to facilitate communications with different networks.

S-GW 172, which is also known as packet core gateway, in one embodiment, includes IMA 166 which is used to monitor and/or report idle mode paging activity as well as analyze aggregated paging announcements. IMA 166 coupled with server 136 is configured to implement paging activity sink 202. Paging activity sink 202, which can be hardware, software, or a combination of hardware and software, is able to store aggregated or collected paging announcements or special formulated paging announcements for analyzing paging activity. It should be noted that paging activity sink 202 may be placed in S-GW 172, MME 142, or SGSN 108.

Mobile device 206, in one example, includes is a wireless handheld device having a screen 208, button 214, and speaker 216, wherein screen 208 displays a mobile application 210. Mobile device 206 can be a portable wireless UE, such as a smart phone, a laptop, a tablet, and the like, and is connected to a cellular radio network such as radio tower 222 for communicating with P-GW 171 for wireless services. When mobile device 206 is not in use, it switches into an idle mode to conserve power consumption. During the idle mode, mobile device 206, for example, switches off all non-essential functions such as screen 208, radio transmission chip, and input/output ("I/O") interfaces, and leaves essential functions active. One essential function may be the scanner which periodically scans or lists to the broadcast paging channel to check if there is any new message(s). It should be noted that the terms "idle mode," "idle state," and "sleeping mode" mean the same, and they can be used interchangeably.

When a packet core gateway or ASN-GW/SGSN/S-GW/MME detects a mobile such as mobile device 206 entering an idle mode and periodically scanning broadcast paging channel for new messages, the packet core gateway, in one embodiment, assembles a paging announcement with vendor specific type-length-value ("TLV"), which is a special paging announcement or a copy of paging announcement with special fields. In one aspect, the special fields in the paging announcement are vendor specific. For example, a paging announcement with vendor specific TLV may include various special fields, such as packet data, buffer indicator, and out-of-memory ("OOM") indicator.

In one embodiment, S-GW 172, which may include a paging module or IMA 166, is configured to define or provision a vendor specific paging activity monitor TLV which includes multiple fields such as the packet data, buffer indicator, and OOM indicator. The packet data, in one aspect, includes the first 96 bytes of packet triggering paging activity or downstream push data packets. The buffer indicator indicates the number of packets buffered for the mobile such as mobile device 206. The OOM indicator indicates number of packets dropped due to buffering limit.

Server 136, in one embodiment, includes paging activity sink 202, and is configured to provide reports or identify causes of paging burst in accordance with collected, aggregated, accumulated, or stored data such as paging announcements with vendor specific TLV. Server 136 may also perform paging activity sink to analyzing or identifying idle mode DOS attacks utilizing paging activities. In one exemplary instance, upon detecting a downstream push data 230 addressing to mobile device 206 which is in sleeping mode or idle mode, S-GW 172 generates regular paging announcements 234 and paging announcement with vendor specific TLV 232 at approximately the same time. While regular paging announcements 234 are forwarded to mobile device 206 via S-GW 172 and cell site 102, paging announcement with vendor specific TLV 232 is sent to server 136 for storing and/or analyzing. Depending on applications, IMA 166 may broadcast or issue warnings and/or reports regarding bursts of paging messages in the network.

Figure 3:
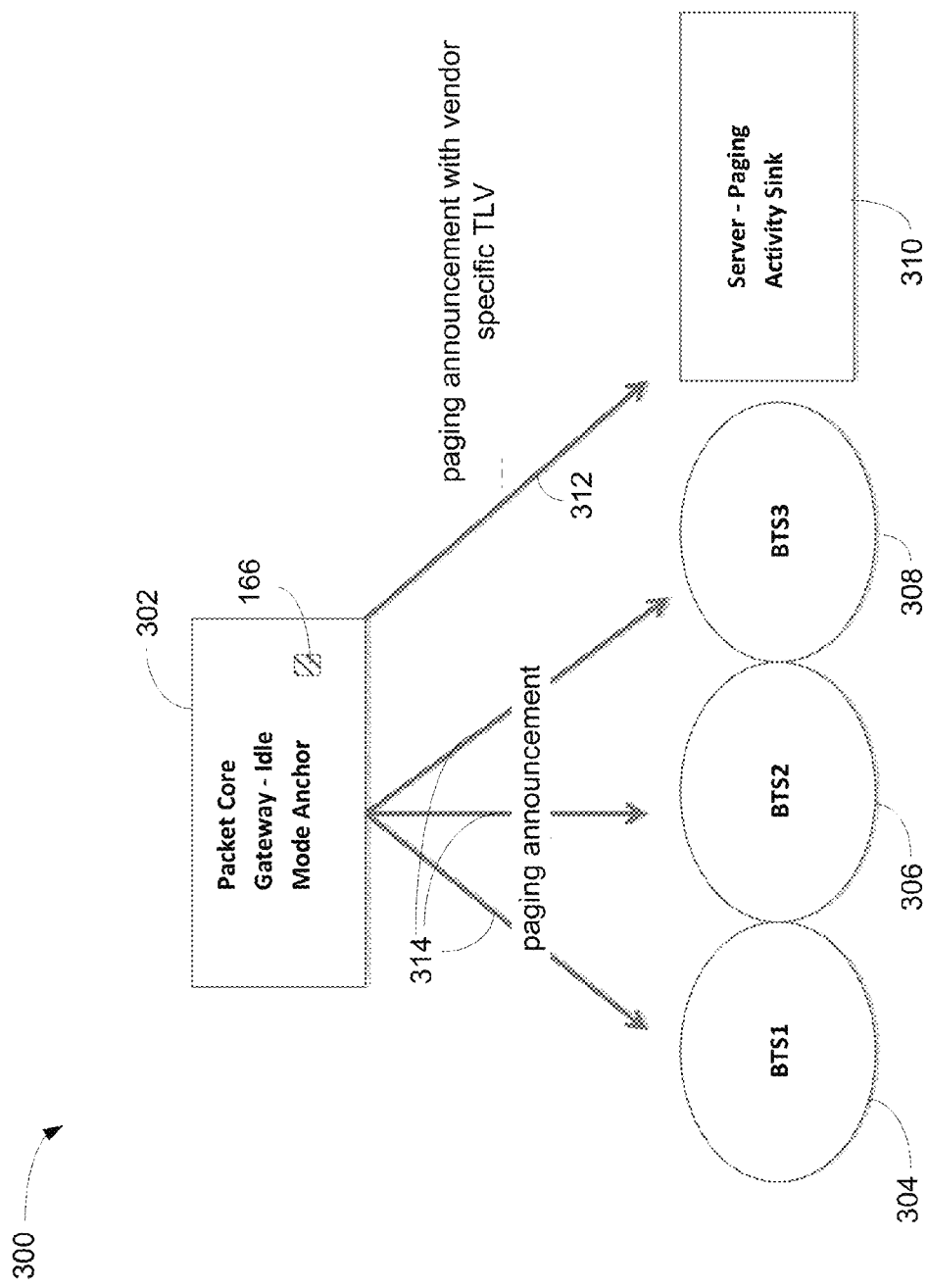
FIG. 3 is a simplified block diagram illustrating an network element configured to implement paging activity sink in accordance with one embodiment of the present invention.

FIG. 3 is a block diagram 300 illustrating a network element configured to implement IMA and paging activity sink in accordance with one embodiment of the present invention. Diagram 300 includes a packet core gateway 302, three cell sites or base stations 304-308, and server 310, wherein packet core gateway 302 includes IMA 166. Server 310, in one aspect, includes a paging activity sink which contains a database for storing paging related information or messages such as various paging announcements with vendor specific TLV. When packet core gateway 302 detects a downstream push data for a mobile which is in an idle mode, packet core gateway 302 generates and forwards paging announcements or regular paging announcements 314 to the mobile via base stations 304-308. At the same time or approximately same time, packet core gateway 302 generates and sends one or more paging announcements with vendor specific TLV 312 to server 310 for paging activity analysis.

Depending on the applications, packet core gateway 302, in one embodiment, is configured or provisioned to define a vendor specific paging activity monitor TLV and is capable of creating a paging activity sink as a new component. After adding the paging activity sink as a member of a paging group, the paging activity sink is able to receive paging announcements with vendor specific TLV and provide reports of idle mode paging activities. In one aspect, the report can be produced in real-time.

Figure 4:
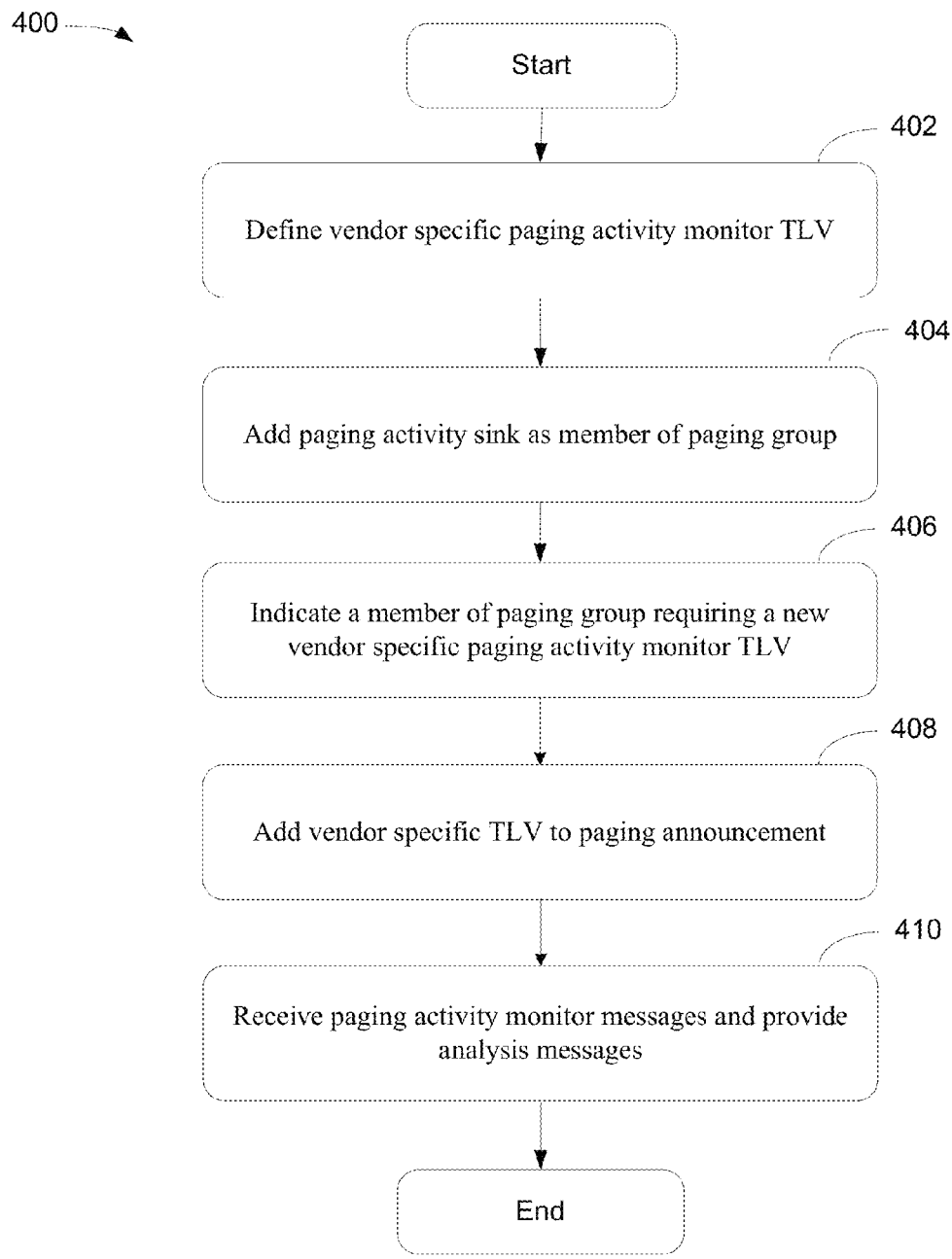
FIG. 4 is a flowchart illustrating an exemplary process of configuring or provisioning network devices to analyze paging activity in accordance with one embodiment of the present invention.

FIG. 4 is a flowchart 400 illustrating an exemplary process of configuring or provisioning network devices to analyze paging activity in accordance with one embodiment of the present invention. At block 402, a process or mechanism of IMA is able to define and/or provision vendor specific paging activity monitor TLV. In one embodiment, a paging announcement with vendor specific TLV contains three (3) fields, namely subTLV1, subTLV2, and subTLV3. SubTLV1, in one example, is designated as packet data which includes a duplicated portion of first several bytes of the packet triggering paging activity or downstream push data. For instance, the packet data may include a copy of first 96 bytes of the packet triggering paging activity or downstream push data. Alternatively, the packet data may include between 8 bytes and 192 bytes of downstream push data addressing to a mobile in an idle mode. SubTLV2 is designated to a buffer indicator while subTLV3 is designated to an OOM indicator. The buffer indicator shows the number of packets buffered for a particular mobile. OOM indictor indicates number of packets dropped due to buffering limitation.

At block 404, the process is able to create a paging activity sink and add the paging activity sink as a new network component. The paging activity sink is subsequently assigned as a member of a paging group. Note that the paging activity sink can be situated in the same network device as IMA or a different network device implementing IMA.

At block 406, IMA or packet core gateway is configured to support a member of paging group that requires a new vendor specific paging activity monitor TLV. For example, instead of receiving regular paging announcement, the paging activity sink receives a special assembled paging announcement which may contain just a portion of regular paging announcement. It should be noted that different vendor may have different specifications for paging activity monitoring criteria.

At block 408, upon defining a paging announcement with vendor specific TLV, the process is capable of adding the vendor specific TLV to paging announcement. In one embodiment, the paging activity sink as a server module is configured to receive the paging announcement with vendor specific TLV or enhanced paging announcement.

At block 410, upon establishing and/or creating the paging activity sink, the server module, which is configured to perform at least a portion of IMA functions, begins to receive and store various paging activity monitor messages and/or paging announcements in the paging activity sink. IMA, in one embodiment, is configured to provide detailed analysis relating to paging messages in response to the stored paging activity monitor messages and/or paging announcements. In one example, IMA looks at SubTLV1 and aggregates across all monitor messages to pin-point the cause for paging activity burst. Also, IMA is able to provide detailed live reports about idle mode and paging activity which indicates performance and/or status of the network.

Figure 5:
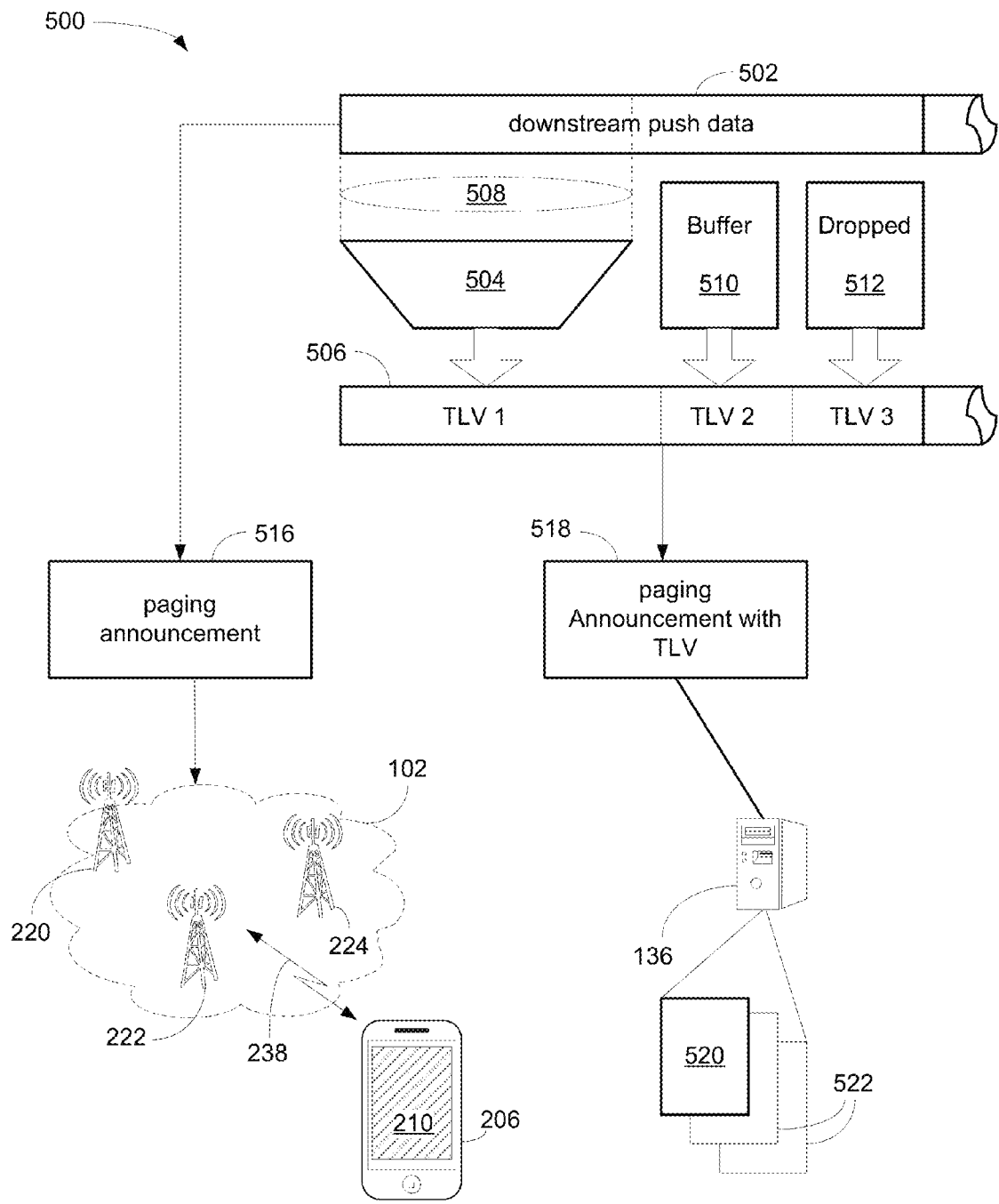
FIG. 5 is a logic flow diagram illustrating an exemplary process of identifying paging activities using paging activity sink in accordance with one embodiment of the present invention.

FIG. 5 is a logic flow diagram 500 illustrating an exemplary process of identifying paging activities using paging activity sink in accordance with one embodiment of the present invention. Diagram 500 illustrates a downstream push data 502, server 136, and mobile 206, wherein server 136, in one embodiment, is configured to be IMA. Mobile 206 could be any mobile devices such as iPhone® in a sleeping mode or idle mode.

Upon detecting downstream push data 502 for mobile 206 which is in an idle mode, a portion 508 of downstream push data content is copied or duplicated to form packet data 504. Paging announcement with vendor specific TLV 506 is subsequently generated. Paging announcement with vendor specific TLV 506 includes TLV1 field, TLV2 field, and TLV3 field, wherein TLV1 field contains packet data which is associated with mobile 206. While TLV2 field is designated to contain a buffer indicator, TLV3 field contains an OOM indicator. In one example, the packet data of paging announcement with vendor specific TLV 506 is the duplicated content 508 of first 96 bytes of downstream push data. In one aspect, the first portion 508 of downstream push data contains controlling information, such as source address, destination address, content, et cetera.

The value of buffer indicator is identified and loaded from a buffer storage 510 which stores buffer indicators for various different mobiles. Upon locating the value of buffer indicator, it is loaded into TLV2 field to indicate number of packets that have been buffered for mobile 206. The value of OOM indicator is identified and loaded from a dropped storage 523 which stores various OOM indicators for various mobiles. Upon locating the OOM indicator associated with mobile 206 in dropped storage 523, it is loaded into TLV3 field to indicate number of packets that have been dropped due to the buffering limit.

Upon assembling regular paging announcement 516, it is broadcasted to mobile 206 via cell site 102. At the same or approximately the same time, paging announcement with vendor specific TLV 518 is also forwarded to server 136 which is configured to performing paging activity sink. Server 136 containing at least a portion of IMA functions, in one embodiment, is able to exam the packet data and other aggregating paging monitoring messages to analyze paging activities. For example, a report 520 that describes cause of paging burst may be issued by server 136 in response to the packet data and/or other aggregating paging monitoring messages. Alternatively, server 136 is able to issue up-to-date status report 522 regarding idle mode and paging activities in response to the packet data and aggregating paging monitoring messages.

The exemplary aspect of the present invention includes various processing steps, which will be described below. The steps of the aspect may be embodied in machine, router, or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
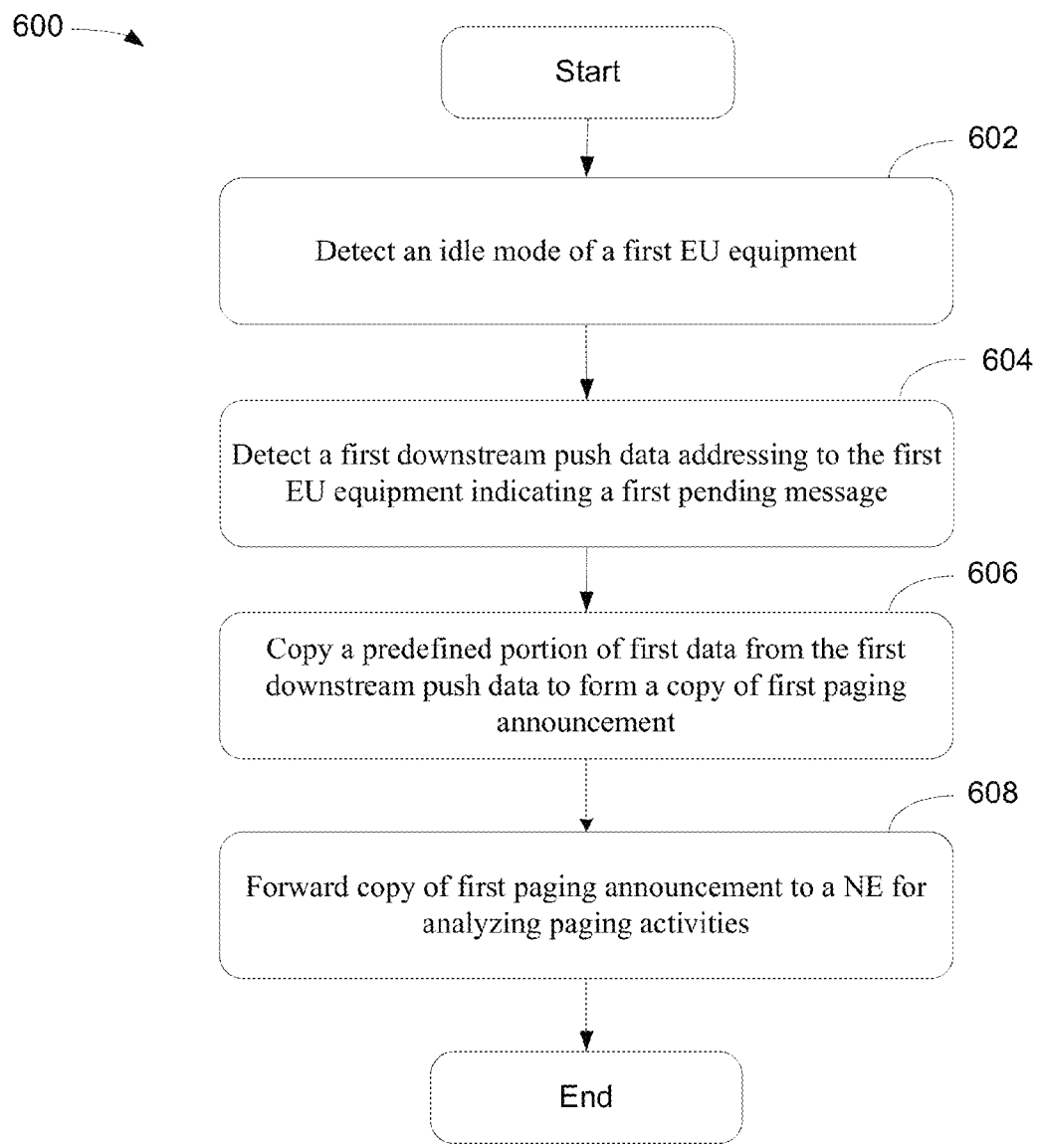
FIG. 6 is a flowchart illustrating an exemplary process of aggregating and analyzing paging activities using paging active sink in accordance with one embodiment of the present invention.

FIG. 6 is a flowchart 600 illustrating an exemplary process of aggregating and analyzing paging activities using paging active sink in accordance with one embodiment of the present invention. At block 602, a process configured to analyze paging activities is capable of detecting an idle mode of first EU equipment in the communication network. For example, the idle status of a wireless handheld device for power conservation is acknowledged. The process, in one aspect, is capable of identifying a broadcast paging channel which is established by the wireless handheld device for paging message scanning.

At block 604, the process is able to detect a first downstream push data addressing to the first EU equipment indicating a first pending (or new) message to the first EU equipment over the communication network. In one aspect, a push email sent by a mail delivery agent ("MDA") is forwarded to a mail user agent ("MUA") configured to reach a wireless handheld device.

At block 606, the process copies a predefined portion of the first downstream push data to form a copy of first paging announcement and sends the first downstream push data to the first EU equipment. In one example, the content of first 96 bytes of the first downstream push data is duplicated and it is subsequently inserted into the copy of first paging announcement.

At block 608, the copy of first paging announcement is forwarded to an NE such as a network server for analyzing paging activities. In one embodiment, the process sends a paging announcement with vendor specific TLV to a network server for monitoring paging activities. In one example, a source of paging activities and the number of occurrences relating to the paging activities may be identified. The process is capable of identifying cause(s) of paging burst in response to value of packet data, buffer indicator, and OOM indicator in the paging announcement with vendor specific TLV. In another example, upon detecting an idle mode of second EU equipment in the communication network, a second downstream push data addressing to the second EU equipment indicating a second pending message is detected. After copying a predefined portion of the second downstream push data to form a copy of second paging announcement, the copy of second paging announcement copy is subsequently sent to the NE for analyzing paging activities. In addition, after detecting a third downstream push data addressing to the first EU equipment indicating a pending message, a predefined portion of the third downstream push data is duplicated to form a copy of third paging announcement. While facilitating the third downstream push data to reach the first EU equipment, the process is able to forward the copy of third paging announcement to the NE for analyzing paging activities. In one embodiment, the process is able to identify origin or source of paging bursts or DOS attacks in accordance with the information stored in the paging activity sink.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for aggregating paging messages in a communication network, comprising
    detecting a downstream push data for a first mobile which is in an idle mode and copying a portion of the downstream push data content to form packet data;
    generating a paging announcement with vendor specific type-length-value ("TLV") including the packet data associated with the first mobile;
    forwarding the paging announcement with vendor specific TLV to a network server configured to performing paging activity sink;
    examining the packet data and aggregating paging monitoring messages to analyze paging activities;
    identifying a buffer indicator configured to indicate number of packets buffered for the first mobile; and identifying an out-of-memory ("OOM") indicator configured to indicate number of packets dropped due to buffering limit,
    wherein the examining the packet data and aggregating paging monitoring messages to analyze source of paging activities includes identifying cause for paging burst and providing an up-to-date status report regarding idle mode and paging activities.

2. A network layout configured to monitor paging activities, comprising:
    a mobile entered in an idle mode for power conservation and periodically scanning broadcast paging channel for new messages;
    a packet core gateway coupled to the mobile via one or more base stations and configured to assemble a paging announcement with vendor specific type-length-value ("TLV"), wherein the paging announcement with vendor specific TLV includes packet data, buffer indicator, and out-of-memory ("OOM") indicator indicating number of packets dropped due to buffering limit;
    a server coupled to the packet core gateway and configured to receive the paging announcement with vendor specific TLV and providing an up-to-date status report regarding idle mode and paging activities, wherein the server performs paging activity sink configured to identify cause of a paging burst.

3. The network layout of claim 2, wherein the packet core gateway includes a paging module configured to define a vendor specific paging activity monitor TLV including the packet data, buffer indicator, and OOM indicator, wherein the packet data includes first 96 bytes of packet triggering paging activity, wherein the buffer indicator indicates number of packets buffered for the mobile, wherein the OOM indicator indicates number of packets dropped due to buffering limit.

4. The network layout of claim 2, wherein the server performs paging activity sink configured to analyzing idle mode denial-of-service attacks utilizing paging activities.

* * * * *